United States Patent [19]
Giner et al.

[11] 3,990,910
[45] Nov. 9, 1976

[54] NICKEL-HYDROGEN BATTERY

[75] Inventors: Jose Giner, Sudbury; Larry L. Swette, Belmont, both of Mass.

[73] Assignee: Tyco Laboratories, Inc., Waltham, Mass.

[22] Filed: May 31, 1972

[21] Appl. No.: 258,151

[52] U.S. Cl.............................. 429/59; 429/206; 429/223
[51] Int. Cl.$^2$........................................ H01M 10/34
[58] Field of Search........... 136/6 G, 6 GS, 28, 86 R, 136/86 A

[56] References Cited
UNITED STATES PATENTS

| | | | |
|---|---|---|---|
| 3,081,366 | 3/1963 | Belove | 136/6 G |
| 3,306,779 | 2/1967 | Flannery et al. | 136/86 D |
| 3,432,355 | 3/1969 | Niedrach et al. | 136/86 D |
| 3,669,744 | 6/1972 | Tsenler et al. | 136/28 |

Primary Examiner—Donald L. Walton
Assistant Examiner—H. A. Feeley
Attorney, Agent, or Firm—Schiller & Pandiscio

[57] ABSTRACT

A rechargeable battery comprising two or more electrochemical cells using a reoxidizable nickel oxide at the positive electrode and hydrogen as the negative electrode reactant. The electrodes of the cells are disposed in a common chamber in a battery case and connected so as to series couple the cells between a pair of terminals. The battery case is precharged with hydrogen gas while the positive electrodes are in a discharged state and then is sealed off. Additional hydrogen gas is evolved during charging and the state of charge can be determined by monitoring the gas pressure in the battery case. On discharging the battery, hydrogen is consumed down to the precharge level. The battery has inherent protection against damage from overcharging and overdischarging. The unique overdischarge mechanism prevents battery failure in the event that one cell in the series in discharged prematurely.

24 Claims, 3 Drawing Figures

NICKEL-HYDROGEN BATTERY

This invention relates to rechargeable batteries and more particularly to a battery comprising two or more cells in which the cathode is a metal oxide and an oxidizable and ionizable gas is the anodic agent.

BACKGROUND OF THE INVENTION

Substantial attention has been devoted to the development of electric power cells which employ a gas as one member and a chemically active solid state material as the other member of the electrochemical couple. One such type is a cell in which the anode is a chemically oxidizable metal and the depolarizer is oxygen, e.g. zinc/air and cadmium/air batteries. A second type utilizes an electrochemically reducible metal oxide, e.g. nickel oxide, at the cathode and a gas that is oxidizable and ionizable, e.g. hydrogen, at the anode. A cell of the latter type is disclosed in U.S. Pat. No. 3,544,375, issued Dec. 1, 1970 to Samuel Ruben for Rechargeable Fuel Cell.

The present invention also employs a reducible metal oxide cathode and an oxidizable and ionizable gas as the anodic agent. The primary object of the invention is to provide a battery that comprises two or more rechargeable cells that overcome certain of the limitations yet offer substantially all of the advantages of the cell disclosed by the aforesaid Ruben patent. More particularly, the cells employed in this invention avoid the requirements set forth in the Ruben patent of supplying hydrogen gas during discharge, venting hydrogen gas during recharging, and submerging the cell electrodes in the electrolyte. Another object of the invention is to provide a battery of the character described which can be repeatedly charged and discharged without need to add more oxidizable gas to the cell to sustain operation. A further object is to provide a battery of the character described that can operate over a wide range of ambient temperatures, has a relatively high energy density, and can be constructed in various configurations. yet another important object is to provide an electric battery having inherent overcharge and overdischarge protection and whose capacity or state of charge can be determined by measuring the gas pressure within the battery case. A further object is to provide a battery comprising a selected number of cells with the electrodes of two or more cells being disposed in a common battery case compartment.

SUMMARY

Broadly stated, the invention comprises two or more cells which have cathode elements that as formed comprise nickel hydroxide on a conductive support. After formation the nickel hydroxide is brought by anodic treatment to an active oxide state so that it can discharge as a consequence of oxidation of monatomic hydrogen produced at the negative electrode. Each negative electrode comprises at least one catalytic layer, the catalytic layer comprising a catalyst such as platinum or palladium which is capable of dissociating molecular hydrogen into monatomic hydrogen. Disposed between and contacting each pair of negative and positive electrodes is a separator or matrix element which is wetted with an electrolyte such as an aqueous KOH solution. Each cell may comprise a single pair but preferably a plurality of pairs of negative and positive electrodes with an electrolyte-wetted matrix or separator between each negative and positive electrode. The electrodes and separators may be disposed in a stacked, cylindrical, spiral or other suitable configuration. The cells are disposed in a battery case and are connected in series with each other between two terminals that are mounted to the case. The case is hermetically sealed after being filled under pressure with hydrogen. The case is evacuated and filled with hydrogen to a selected pressure while the positive electrodes are in a discharged state, whereby sufficient hydrogen is available to provide overdischarge protection. The battery case remains sealed at all times during charging and discharging operations. The capacity or state of charge of the battery can be determined by measuring the gas pressure in the case.

DETAILED DESCRIPTION OF THE INVENTION

Figure 2:
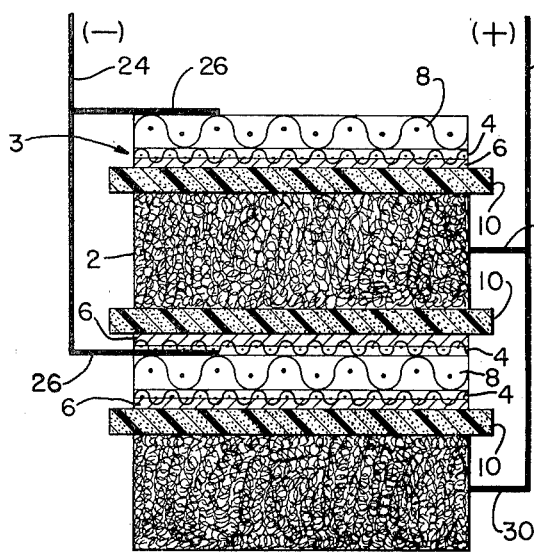
FIG. 2 is an enlarged vertical sectional view showing details of a portion of one of the cells embodied in the battery of FIG. 1.
Figure 1:
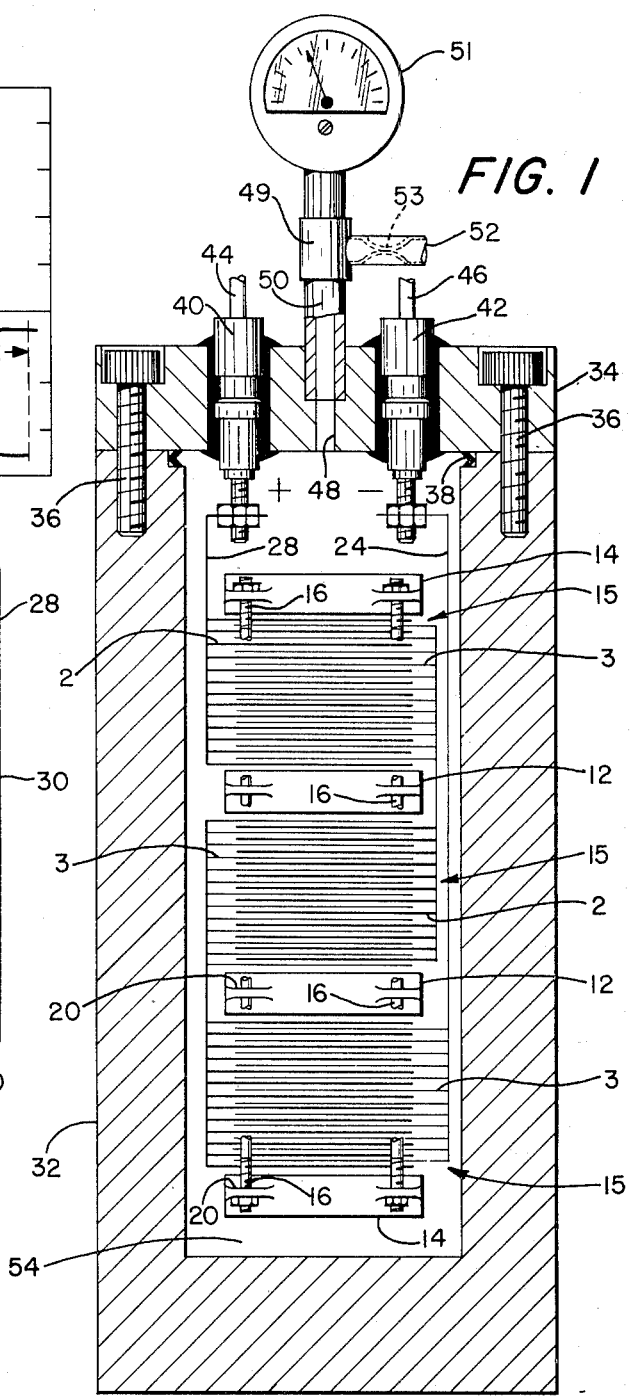
FIG. 1 is a vertical section view (partly in schematic form) of a Ni/H$_2$ battery constituting a preferred embodiment of the invention.

Before describing the preferred embodiment in detail, it is to be noted that, for the sake of convenience of illustration and also to facilitate understanding of the invention, in FIG. 1 the electrolyte matrices are omitted and the positive and negative electrodes are illustrated in schematic form. FIG. 2 shows actual details of construction and disposition of the electrodes and matrices embodied in the battery of FIG. 1.

Referring now to FIGS. 1 and 2, in the preferred embodiment of the invention each cell comprises a plurality of positive electrodes 2 which are in the form of flat, porous, sintered nickel plaques impregnated with Ni(OH)$_2$. The plaques are made by pressing nickel powder and a suitable binder, e.g. methylcellulose, into plate form and then sintering the pressed mixture to burn off the binder so as to render the plate porous. The sintering preferably is done in a hydrogen atmosphere at a suitable temperature, e.g. 900° C. These plaques are then impregnated with Ni(OH)$_2$. This may be done by immersing the plaques in an aqueous nickel nitrate solution, removing them from the solution, and then making the plaques cathodes in an aqueous KOH electrolyte whereby the nickel nitrate is cathodized to nickel hydroxide, Ni(OH)$_2$. Thereafter the impregnated plaques are washed to remove any residual nitrate and the nickel hydroxide is oxidized to a trivalent state (NiOOH) by anodizing in an alkaline electrolyte, e.g. aqueous KOH. An alternative mode of impregnating the plaques (and the ones used in making the cathodes of the battery of Example I below) consists of immersing the sintered plaques in a nickel nitrate solution, which contains 500 grams Ni(NO$_3$)$_2$ per liter of water, long enough to fill their pores, removing the plaques from the solution and drying them in air, and immersing them in a potassium hydroxide bath at 80° C so that the infiltrated Ni(NO$_3$)$_2$ reacts with the KOH to form Ni(OH)$_2$. Regardless of the procedure used to form the cathodes, it usually must be repeated a number of times to load the plaques with sufficient Ni(OH)$_2$ to provide a desired capacity. Once the plaques have been loaded with the desired amount of nickel hydroxide, they are oxidized (to the trivalent state) and reduced, i.e. charged and discharged, by anodizing and cathodizing in potassium hydroxide or other suitable alkaline electrolyte. This charging-discharging procedure is preferably repeated at least about three times to assure that all of the nickel hydroxide is activated, i.e. oxidized, and also to allow time for loose particles to fall off of the plates. Such loose particles are undesired in the assembled battery since they may cause cell short-circuiting.

The negative electrodes 3 are constructed in the manner of conventional catalytic fuel cell electrodes and thus in the illustrated embodiment each anode comprises two relatively thin nickel screen 4 coated on one side with a layer 6 consisting of platinum intermixed with an bonded by Teflon or other suitable hydrophobic plastic matrix material. Each negative electrode also comprises a relatively coarse screen support 8 which is made of a conductive metal, preferably nickel, or a plastic. The screen support 8 is positioned between and engages the uncoated sides of screens 4.

Positioned between each positive electrode 2 and the adjacent negative electrode assembly is a separator 10 made of a porous material. Preferably the separator is a polypropylene mat which is porous to the electrolyte and hence it is sometimes referred to herein as an electrolyte matrix. The positive and negative electrodes and separators are assembled in a stack in the order shown in FIG. 2. It is to be noted that FIG. 2 shows only a few of the above-described positive and negative electrodes and electrolyte matrices and that additional like members may be added to form a cell consisting of a relatively large stack 15 of plates as contemplated in the device of FIG. 1.

The battery illustrated in FIG. 1 comprises three cells each consisting of a stack 15 of plates assembled in the order shown in FIG. 2. It is to be noted that in FIG. 1, for convenience and simplicity of illustration, the positive electrodes 2 are represented schematically as relatively heavy lines and the negative electrodes 3 are represented by relatively light lines. The stacks are separated by rigid insulating spacer plates 12 which may be made of nickel and coated with a layer of insulating material but preferably are made of an inert plastic or a ceramic. By way of example and not limitation, the plates 12 may be made of polyvinyl chloride, polyethylene, polystyrene or nickel coated with one of the foregoing polymers. A suitable ceramic is alumina. Two end plates 14, identical to plates 12, are positioned at opposite ends of the array of stacks 15 and these are coupled to the intervening spacer plates 12 by means of two or more tie rods 16. The tie rods may extend through matching holes formed in the electrodes and electrolyte matrices, in which case they must be insulated from the electrodes and matrices to prevent short-circuiting. This is best accomplished by making the tie rods of electrical insulating material. Preferably, however, the tie rods are mounted exterior of the electrode stack. Thus as shown, the plates 12 and 14 have ears 20 on their peripheries and the tie rods 16 extend through such ears and are secured in place by nuts 22 as shown. Notwithstanding the schematic representation of the electrodes in FIG. 1, it is to be understood that the nuts 22 are tightened up enough to hold spacer plates 12 and end plates 14 in engagement with the adjacent electrodes and also that plates 12 and 14 and tie rods 16 coact to hold the several cell stacks 15 in a firm array as shown, with the electrolyte matrices and electrodes in each stack engaging each other in the manner shown in FIG. 1. The several negative electrode assemblies in each cell stack 15 are electrically connected together by a nickel strap 24 which has tabs 26 that are welded to each of the coarse screens 8 when the latter are made of a conductive metal and to the screens 4 when the coarse screens 8 are made of plastic. The positive electrodes 2 are electrically connected together by a second nickel strap 28 which has tabs 30 that are welded to the sintered nickel plaques.

The cell stacks 15 are disposed in a nickel casing 32 that is formed with one open end. The latter is closed off by a nickel end cap 34 which is secured in place in any conventional manner that provides a hermetic seal. In this case the end cap is secured in place by means of screws 36 that are screwed into tapped holes in the casing and a ring seal 38 which is compressed by the end cap in a groove formed in the casing so as to provide assurance against gas leakage. Mounted in openings in the end cap are two electric terminal assemblies comprising ceramic feedthrough insulators 40 and 42 formed around terminal leads 44 and 46 respectively. A preferred form of feedthrough insulator is shown in U.S. Pat. NO. 3,109,055. The insulators are mounted and hermetically sealed to the end cap to prevent gas leakage.

The cell stacks are coupled together in series by interconnecting the strap 24 of one stack with the strap 28 of the next stack, with one of the straps of the first-in-line cell connected to terminal lead 44 and the non-corresponding strap of the last-in-line cell connected to terminal lead 46. Thus, in FIG. 1, strap 28 of the first cell and strap 24 of the last cell are connected to terminal leads 44 and 46 respectively.

The end cap also has a port 48 in which is mounted and hermetically sealed a nickel tube 50 to which is secured a tee fitting 49, with a pressure gauge 51 connected to one side of the fitting and a filling tube 52 connected to the third side of the fitting. Filling tube 52 is permanently closed off, e.g. by pinching and welding it to itself as shown at 53 or by suitable valve means (not shown) after the chamber 54 of the case is presurized with hydrogen as hereinafter described.

In assembling the battery a quantity of the electrolyte, preferably a 20–35% water solution of potassium hydroxide, is placed in the chamber 54 prior to insertion of the cell stacks and attachment of the end cap. The quantity of electrolyte placed in the chamber is limited; preferably there is just enough electrolyte to wet the electrolyte matrices, the nickel electrodes and the catalytic layers of the negative plates. However, a greater amount of electrolyte may be used, e.g. enough electrolyte may be used to leave a small residual pool thereof in the casing. In no event, however, should the amount of electrolyte be great enough to keep the cell stacks immersed. With the electrolyte added, the cell stacks 15 are inserted and the end cap is attached. It also is possible to add the electrolyte to the casing via the filling tube after the cell stacks are inserted and the end cap secured in place. As an alternative procedure, it is possible to immerse the cell stacks in the electrolyte outside of the case long enough to get the desired degree of wetting and then to place them in the casing. Assuming that the electrolyte is added directly to the casing, the end cap is secured in place, the filling tube is blocked off and the casing is turned upside down and rotated or tilted so that the electrolyte will contact and wet the plates of the cell stacks to the degree required. Once this is done, the casing is filled with hydrogen to a selected pressure and then the filling tube is permanently closed off.

Preferably the positive plates are in fully discharged state when the casingg is initially pressureized with hydrogen. This assures protection against overdischarge as described more fully below.

Operation of the battery of FIGS. 1 and 2 will now be discribed. Assume that the battery has been fully charged, and that it is connected for discharge through an exterior circuit. Hydrogen gas diffuses through electrolyte surrounding the catalyst surfaces of the negative plates, and after arriving at said surfaces becomes dissociated by the catalyst to the monatomic form. This monatomic hydrogen is ionized and combines with hydroxyl ions to form water with an electron being released in the process of forming each hydrogen ion. The reactions at the negative electrode are as follows:

$$H_2 \rightarrow 2H \tag{1}$$

$$2H \rightarrow 2H^+ + 2e \tag{2}$$

$$2H^+ + 2OH^- \rightarrow 2H_2O \tag{3}$$

The net reaction at the negative electrode during discharge is:

$$\tfrac{1}{2}H_2 + OH^- \rightarrow H_2O + e \tag{4}$$

Hydroxyl ions are formed at the positive electrode by reaction of water with the available oxygen component of the nickel oxide. the representative reaction at the positive electrode during discharge is as follows:

$$NiOOH + H_2O + e \rightarrow Ni(OH)_2 + OH^- \tag{5}$$

As a result of these reactions, as electron current is produced in the exterior circuit and the total cell reaction is as follows:

$$NiOOH + \tfrac{1}{2}H_2 \rightarrow Ni(OH)_2 \tag{6}$$

On recharging, the reaction (6) is reversed. The recharging mode is characterized by the regeneration of hydrogen gas at the negative electrode and the reoxidation of the nickel hydroxide at the positive plate.

A battery constructed in accordance with the teaching of this invention has inherent or built-in protection against overcharging or overdischarging. This built-in protection is facilitated by the fact that the casing is pressurized with hydrogen gas while the positive electrodes are in a fully discharged state and also by the fact that the electrodes are not immersed in the electrolyte. Using a limited amount of electrolyte facilitates diffusion of hydrogen and oxygen for reaction as herein described. The protection against overcharging and overdischarging will now be described.

Consider first the case of charging the battery. On charging The Ni(OH)$_2$ is oxidized to NiOOH. During the charging cycle, the positive electrodes reach an endpoint corresponding to completion of the following reation:

$$Ni(OH)_2 + OH^- \rightarrow NiOOH + H_2O + e \tag{7}$$

The negative electrodes, on the other hand, have no such endpoint since they simply continue to consume water according to the following reaction:

$$H_2O + e \rightarrow \tfrac{1}{2}H_2 + OH^- \tag{8}$$

Thus as the positive plates approach the fully oxidized (charged) state, oxygen and water begin to be produced at the positive electrodes according to the following reaction:

$$2OH^- \rightarrow 1/2O_2 + H_2O + 2e \tag{9}$$

However, at this time hydrogen is also being evolved at the negative electrodes according to reaction (8). In the presence of the catalyst surface and the large amount of hydrogen, the oxygen evolved at the positive electrodes reacts to produce water according to the following reaction:

$$H_2 + 1/2O_2 \rightarrow H_2O \tag{10}$$

or it may be reduced directly at the negative electrodes according to reaction (11) which is the reverse of reaction (9):

$$1/2O_2 + H_2O + 2e \rightarrow 2OH^- \tag{11}$$

It is not known (and also immaterial) which of the above recombination reactions occur, or if both occur, which one predominates. In any event, any oxygen that is released as a result of overcharging a positive electrode is consumed by reaction with the cells, and thus the battery cells are protected against overcharging. It is to be noted that with both recombination processes, the same quantity of current is passed, resulting in the conversion of energy (equivalent to the difference in potential between positive and negative electrodes) to heat with no net mass change.

Consider now the case of discharging the battery. On discharging the cells, the positive electrode material is reduced to Ni(OH)$_2$ and hydrogen gas in the cells is consumed. Since the cells are series-connected, cell reversal (or overdischarge) of an individual cell can occur as current continues to flow through the discharged cell. In this case, as the positive electrode plates approach the full discharge condition, hydrogen gas begins to be evolved at the positive plates by reaction of water according to the reaction (8) above (it is to be noted that the reduction of Ni(OH)$_2$ to nickel is quite slow). At the same time hydrogen oxidation continues at the negative plates according to reaction (4) above. All of the negative electrodes have the same capacity defined only by the hydrogen pressure. Since excess hydrogen is present (the amount of hydrogen in each cell is in excess of the stoichiometric requirement due to hydrogen being supplied to the cells while in a full discharged state) hydrogen depletion at the negative electrodes is prevented and cell pressure remains constant. As a consequence, overdischarging produces neither excess pressure nor deleterious effects on the electrodes. Another feature of this overdischarge protection is that it allows a cell to be reversed with very little heat generation.

An advantage of this invention is that the pressure in the battery case can be used as a quantitative indication of the state of charge. As noted above, the case is pressurized with hydrogen while the positive plates are in a discharged state. As the battery is charged, hydrogen is evolved and this causes the pressure in the battery case to increase. When the battery is again discharged, hydrogen gas is consumed and the gas pressure in the casing drops.

In practice, the battery case is designed with a volume capacity such that sufficient negative capacity is provided for overdischarge protection and also so as to provide a sizeable differential between the gas pressure at full charge and the gas pressure at full discharge. Preferably a differential of at least a hundred and more preferably several hundred pounds per square inch is provided.

Measuring the state of charge by monitoring the pressure involves (a) providing a predetermined minimum gas pressure in the case when the battery is in its fully discharged state, (b) determining the total gas pressure of the battery when it is fully charged, and (c) establishing by direct measurements the relationship between the state of charge and the gas pressure of the battery. Then with such information, it is possible to calibrate the gas pressure gauge 51 in incremental units of state of charge, so that the user can determine by reading the gauge the state of charge of the battery.

The following example illustrates a preferred mode of practicing the invention.

EXAMPLE

A $Ni/H_2$ battery having a construction as above described in connection with FIGS. 1 and 2 is fabricated. The pressure casing and end cap are made of nickel and the each of the three cells comprises a stack of 16 nickel electrodes, 17 platinum negative electrode assemblies and 32 electolyte-porous polypropylene matrices assembled in the order shown in FIG. 2. Each anode assembly comprises a pair of nickel screens 4, each impregnated with a platinum-Teflon coating 6 as above described, separated by a coarse nickel screen as shown at 8. Each screen 4 has a thickness of about 10 mils and has square-shaped pores measuring about 40 mils on each side. Screens 8 are about 12 mils thick and have square-shaped pores that measure about 80 mils on each side. The coatings 6 comprise about 70 wt. percent Pt and 30 wt.% Teflon. The coatings fully fill the pores of screens 4 and extend about 1 mil beyond one side of each screen, i.e. each Pt-Teflon coating is about 11 mils thick. Each nickel electrode is about 0.076 cm (30 mils) thick and has an active area of about 9.6 $cm^2$ per side. The nickel electrodes are prepared by infiltrating the sintered nickel plaques with aqueous $Ni(NO_3)_2$ and then reacting the $Ni(NO_3)_2$ with 30% KOH to form $Ni(OH)_2$. After formation the nickel electrodes each have a capacity of 0.307 Ahr. and each stack has a capacity of about 5 Ahr. The matrices have a thickness of 7 mils and are wetted with 30% KOH. The total weight of the components of the three cells (cell stacks only including conduction tabs as shown at 26 and 30) is about 311.4 grams of which about 19.2 grams is electrolyte. Almost all of the electrolyte is in the cell stack, the remainder (less than about 1 gram) is in the chamber of the nickel casing. The free space in the chamber available as gas volume is about 360 $cm^3$. The nickel positives are installed in the casing in a fully discharged state. The casing is initially pressurized with hydrogen to a pressure of about 100 psi, at which point the hydrogen filler tube is permanently sealed off. The cell is then charged by connecting it to a suitable d.c. power supply.

Figure 3:
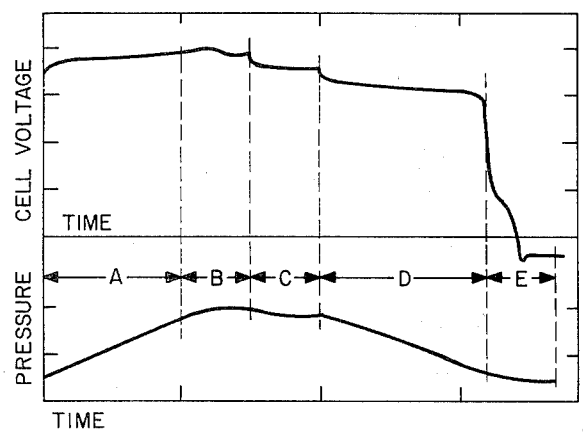
FIG. 3 consists of curves illustrating how the gas pressure and voltage of a preferred embodiment of the invention vary during a typical test cycle of charging and discharging.

A battery constructed as described in the foregoing example has an open circuit potential in the fully charged state of about 3.93 volts (a single fully charged cell has an open circuit potential of about 1.31 volts). The operating characteristics of a single cell and a battery constructed as described in the foregoing example are similar under charge and discharge conditions. As seen in FIG. 3, during charge (period A), the gas pressure increases substantially linearly with time. However, as the cell goes from the fully charged state (point A) to the overcharge state, the pressure-time curve departs from linearity and, due to the overcharge protection mechanism described above, the gas pressure levels off as the overcharge phase (period B) is extended. During overcharge the potential of a single cell goes through a maximum of about 1.5 volts and then declines slightly. The pressure-time curve reaches a plateau after approximately 30% overcharge and does not rise significantly over this level at 50% or even 100% overcharge. On open circuit (period C), the voltage and gas pressure drop slightly and stabilize. During discharge (period D), the gas pressure drops linearly up to a 1.0V cut-off. The voltage drops sharply when overdischarge (period E) commences and then more slowly during consumption of the oxygen produced and stored on the positive plates during overcharge until a sharp reversal in potential occurs. This reversal in potential is indicative of hydrogen evolution. During this period the pressure drops to the precharge level as initially pressurized, thereby indicating stoichiometric consumption of hydrogen on the anode has been completed and operation of the overdischarge mechanism as above described.

It is to be noted that the double electrode arrangement used for the negative may not be necessary; thus each dual electrode assembly may be replaced by a single platinum electrode, e.g. the arrangement of FIG. 2 could be modified by eliminating one of the screens 4 from each anode assembly. A significant advantage of the dual electrode arrangement used for the negative electrode is that the coarse screen 8 facilitates diffusion of gas into the electrode stack as well as providing support for the platinum-Teflon electrodes. Accordingly, use of screens 8 or some other suitably porous member in association with the platinum-Teflon electrodes is preferred even if each anode comprises a single catalytic electrode. It also is contemplated that holes may be provided in the electrodes and electrolyte matrices to facilitate gas diffusion. Preferably but not necessarily the holes in the positive and negative electrodes are aligned with each other and also with holes in the electrolyte matrices.

Batteries made in accordance with this invention offer certain specific advantages over nickel-cadmium cells. For one thing, in a Ni/Cd cell it is not possible to quantitatively determine the state of charge from the gas pressure in the cell case. Also in a Ni/Cd cell true overdischarge protection can be achieved in theory only by using a Cd precharge and an anti-polar mass. Even then it is not reliable and considerable heat evolution is to be expected. The invention also offers advantages over $Cd/O_2$ and $H_2/O_2$ cells. With the latter cells overcharge protection is difficult because the positive and negative electrodes have to be separated by a gas impermeable separator. The latter also is required in a $Cd/O_2$ cell to avoid self discharge. In the case of the $H_2/O_2$ cells, overcharge protection requires a large water storage capacity to prevent drying of the electrolyte matrix and even under these conditions catastrophic pressure differentials can appear in an integral $H_2/O_2$ cell on overdischarge.

A further and most important advantage is that a single supply of negative electrode reactant is used for all of the cells, so this facilitates use of a variable number of cells in a single case to provide a battery of desired voltage. Furthermore the quantity of negative electrode reactant required to be supplied for different size batteries need not be premeasured accurately since the hydrogen gas is added to the cell case while the positive electrodes are in a discharged state. As noted above, the negative electrode reactant is added until the gas pressure in the case is at a desired level, e.g. 100 psi., and then the case is sealed off. A further advantage is that it is not necessary to subdivide the the cell case into separate compartments, one for each cell and, for example, unlike standard lead acid batteries, the interconnections between the several cells may be located wholly within the battery case.

As noted above, the negative or hydrogen electrode essentially comprises an electrocatalyst. The latter may be platinum or palladium, as previously noted, or one of the following: Raney nickel, rhodium, columbium, silver, gold, ruthenium, osmium, or iridium, or alloys or oxides thereof. However, certain of these may be less preferable than others with respect to electrochemical activity and resistance to corrosion in the cell environment. The metal blacks of Group VIII of Mendelyeev's Periodic Table are most suitable in a fuel cell electrode since they are available in a finely divided state as required to maximize the reactive electrode surface area. Platinum is the preferred catalyst.

The negative electrode may be constructed in accordance with known fuel cell electrode technology. However, regardless of its exact structure and configuration, the negative electrode must permit gas diffusion to the reactive catalyst and must be resistant to electrolyte flooding. For this reason, it is preferred to disperse the catalyst particles in a gas permeable matrix material that is hydrophobic. The matrix material also should be resistant to corrosion and provide sufficient binding action to hold the catalyst particles in place. By way of example but not limitation, the hydrophobic binder is a polymer material. Exemplary suitable materials are polytetrafluoroethylene, polytrifluorochloroethylene, polyvinyl fluoride, polyvinylidenefluoride, polytrifluoroethylene, polystyrene, polymethylmethacrylate, polymethacrylate, polyacrylonitrile, polyvinyl chloride, polyethylene, and copolymers thereof. Teflon is the preferred polymer. the ratio of polymer to catalytic metal is not critical. Preferably, however, the catalyst-polymer mixture comprises about 50–80% metal and 50–20% polymer on a weight basis. It is preferred that the thickness of the catalyst-polymer layer be in the order of 10 mils and that such layer have a pore size distribution in the range from about 0.01 to 100 microns. Although it is possible to fabricate electrodes consisting only of a continuous film of catalyst particles in a hydrophobic polymer matrix, it is preferred to utilize a porous conductive element such as screen 4 in the electrode structure to permit more effective current takeoff, improve the mechanical integrity of the electrode and facilitate gas diffusion to the catalyst surface. Of course, screen 4 could be replaced by a sintered plaque or a metal felt or mesh or wool, e.g., nickel wool. Other possible variations in the structure and method of fabricating the anodes are obvious from the teachings presented in U.S. Pat. Nos. 3444004, 3533851, and 3553022, and the references cited in said patents. Another possibility is use of a dual porosity electrode such as a porous nickel sinter without a hydrophobic component. In this case the small pores are filled with electrolyte by capillarity and the large pores are empty (gas filled) if the electrolyte fill level has been carefully adjusted. The catalyst is placed preferentially in the small pores.

Of course, the electrodes and electrolyte matrices also may be constructed and arranged as concentric members or bent in a spiral fashion to provide a so-called "jelly roll" structure.

One can also incorporate cobalt hydroxide in the active nickel oxide mass of the positive electrode to improve charge cycle life. Typically about 8% of the active mass will consist of cobalt hydroxide.

Although aqueous KOH is the preferred electrolyte, the KOH may be replaced by or mixed with other alkaline salts, e.g. sodium or lithium hydroxides or mixtures thereof.

Although in the foregoing example the battery case is made of nickel, it may be constructed of some other material, notably a relatively light-weight plastic such as an epoxy resin preferably but not necessarily reinforced with glass fibers.

What is claimed is:

1. A rechargeable battery comprising a case and at least two $Ni/H_2$ cells mounted in said case; said at least two cells each comprising at least one positive electrode and at least one negative electrode with a porous separator between each positive and negative electrode, each positive electrode comprising NiOOH and each negative electrode comprising a conductive support and a catalyst material capable of dissociating molecular hydrogen to monoatomic hydrogen carried by said support, said catalyst material being from the class consisting of platinum, palladium, Raney nickel, rhodium, columbium, silver, gold, ruthenium, osmium, iridium, and alloys and oxides thereof, an aqueous alkaline electrolyte in the pores of each separator, electrically conductive means coupled to said electrodes for connecting said cells in series with one another, and a supply of hydrogen in said case surrounding the said electrodes and separators, said case being hermetically sealed to prevent inflow and outflow of gas during discharging and charging of said cells.

2. A battery according to claim 1 wherein each cell comprises a plurality of said positive and negative electrodes and separators disposed in stacked relation to each other, means electrically connecting said plurality of positive electrodes in parallel with each other, and means electrically connecting said plurality of negative electrodes in parallel with each other.

3. A battery according to claim 1 wherein the supply of hydrogen in said case is more than sufficient to fully reduce the NiOOH of all of said positive electrodes to $Ni(OH)_2$.

4. A battery according to claim 1 wherein said catalyst material is disposed in a plastic hydrophobic matrix.

5. A battery according to claim 1 wherein each negative electrode has a dual porosity structure.

6. A battery according to claim 1 wherein the electrolyte fills less than all of the pores of each porous separator so that oxygen generated at the positive electrodes during charging can diffuse to and combine with hydrogen at the negative electrodes.

7. A battery according to claim 1 wherein the quantity of electrolyte in said case is insufficient to envelope said positive and negative electrodes.

8. A battery according to claim 1 further including means providing passages for diffusion of gas to said negative electrodes.

9. A battery according to claim 1 wherein each negative electrode comprises two conductive supports with said catalyst material being disposed on each of said supports, and means between said supports providing passages for diffusion of gas to said catalyst material.

10. A battery according to claim 1 wherein said separator is made of a material that is electrically non-conductive but is permeable to hydroxyl ions, oxygen and hydrogen.

11. A battery according to claim 1 wherein said electrodes have holes to facilitate gas diffusion.

12. A battery according to claim 1 wherein said catalyst material is platinum, palladium or Raney nickel.

13. A battery according to claim 1 wherein each negative electrode comprises a porous conductive member and two conductive screens disposed on opposite sides of said porous conductive member, said catalyst material being mounted on said screens.

14. A battery according to claim 1 wherein the electrodes and separators of each cell are substantially planar elements and are disposed in a stack and further including means for holding said electrodes and separators in stacked relation to each other.

15. A battery according to claim 14 wherein the stacked electrodes and separators of the at least two cells are aligned with each other, and further including spacer means separating and electrically insulating the end electrodes of adjacent cells.

16. A battery according to claim 1 wherein said catalyst material is platinum.

17. A battery according to claim 1 wherein said catalyst material is palladium.

18. A battery according to claim 1 wherein said catalyst material is Raney nickel.

19. A rechargeable $Ni/H_2$ battery comprising a case defining a compartment; at least two groups of cell components in said compartments, each of said groups comprising at least one positive electrode and at least one negative electrode with a porous separator separating each positive electrode from each negative electrode; each positive electrode comprising $Ni(OH)_2$ and each negative electrode comprising a catalyst material that is capable of dissociating molecular hydrogen to monoatomic hydrogen, with an aqueous alkaline electrolyte in the pores of each separator said catalyst material being from the class consisting of paltinum, palladium, Raney nickel, rhodium columbium, silver, gold, ruthenium, osmium, iridium, and alloys and oxides thereof, a supply of hydrogen in said compartment surrounding and contacting all of said electrodes and separators so that each of said groups of cell components and said supply of hydrogen coact to form a rechargeable cell; said compartment being sealed to prevent inflow and outflow of gas during discharging and charging of said cells; and conductive connecting means including terminal means providing positive to negative electrode connections between said groups so that cells are connected in series with each other.

20. A battery according to claim 19 wherein said catalyst material is platinum.

21. A battery according to claim 19 wherein said catalyst material is palladium.

22. A battery according to claim 19 wherein said catalyst material is Raney nickel.

23. A battery according to claim 2 wherein said electrodes and separators are substantially planar elements and said at least two cells are aligned with each other end to end in a stacked array, and further including electrically insulating spacer members separating the confronting end electrodes of adjacent cells, end plates at opposite ends of said array, means connecting said end plates so as to hold said cells in said array, and terminal means providing positive to negative electrode connections between said cells so that said cells are connected in series with one another.

24. A battery according to claim 23 wherein said connecting means are tie rods and said spacer members are connected to said tie rods.

* * * * *

UNITED STATES PATENT OFFICE
CERTIFICATE OF CORRECTION

Patent No. 3,990,910                   Dated November 9, 1976

Inventor(s) Jose Giner et al.

It is certified that error appears in the above-identified patent and that said Letters Patent are hereby corrected as shown below:

On the cover sheet the illustrative figure should appear as shown below:

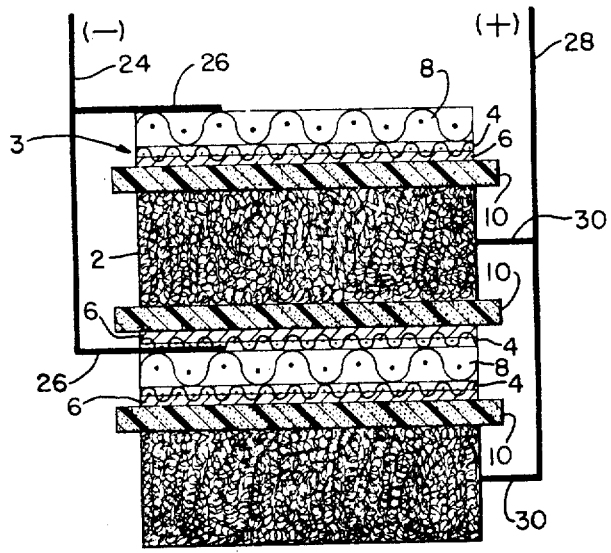

$\mathfrak{Signed}$ and $\mathfrak{Sealed}$ this

Eleventh  $\mathfrak{Day\ of}$  January 1977

[SEAL]

Attest:

RUTH C. MASON  
*Attesting Officer*

C. MARSHALL DANN  
*Commissioner of Patents and Trademarks*